US006187356B1

(12) United States Patent
van Buuren et al.

(10) Patent No.: US 6,187,356 B1
(45) Date of Patent: Feb. 13, 2001

(54) DEBITTERING OF OLIVE OIL

(75) Inventors: Jan van Buuren; Albertje Johanna Knoops; Karel P A M van Putte; Hessel Turksma; Michael Gude; Williams Andreas de Groot, all of Vlaardingen (NL)

(73) Assignee: Unilever Patent Holdings BV, Vlaardingen (NL)

( * ) Notice: Under 35 U.S.C. 154(b), the term of this patent shall be extended for 0 days.

(21) Appl. No.: 09/238,175

(22) Filed: Jan. 28, 1999

(30) Foreign Application Priority Data

Jan. 28, 1998 (EP) ................................................ 98200235

(51) Int. Cl.[7] ...................................................... A23D 9/02
(52) U.S. Cl. ............................................ 426/417; 426/417
(58) Field of Search ..................................... 426/601, 417

(56) References Cited

U.S. PATENT DOCUMENTS

| | | | | |
|---|---|---|---|---|
| 2,199,364 | * | 4/1940 | Musher | 426/330.6 |
| 2,221,404 | * | 11/1940 | Musher | 426/330.6 |
| 2,838,553 | * | 6/1958 | Cuyres . | |
| 2,917,525 | * | 12/1959 | Thurman | 554/195 |
| 3,102,898 | * | 9/1963 | Schmitt | 554/203 |
| 4,816,189 | * | 3/1989 | Rothbart | 260/420 |
| 5,089,139 | * | 2/1992 | Asbeck | 426/330.6 |
| 5,962,056 | * | 10/1999 | Melin | 426/417 |

FOREIGN PATENT DOCUMENTS

| | | | | |
|---|---|---|---|---|
| 0 849 353 A1 | | 6/1998 | (EP) | C11B/3/00 |
| WO98/07337 | * | 2/1998 | (GR) . | |
| WO 97/32947 | | 9/1997 | (WO) | C11B/5/00 |

OTHER PUBLICATIONS

Anon 1998 Kirk–Othmer Encylcopedia of Chemical Technology 4th ed. vol. 25 John Wiley & Sons New York p. 424–433.*

Peterson 1978 Encylopedia of Food Science The AVI Publishing Co., Inc Westport CT 860–863.*

Govacchino et al 1993 Effect of Extraction Systems on the Quality of Virgin Olive Oil JAOCS 71 (11) 1189–1194.*

Lowe 1937 Experimental Cookery 2nd Edition John Wiley & Sons, Inc New York p 266–267.*

Hui 1996 Beuleys Industrial Oil and Fat Products, vol. 2, 5th edition John Wiley & Sons New York p 241–256.*

Hui 1996 Baileys Industrial Oil and Fat Products, vol. 1 5th edition John Wiley & Sons, New York p 444–445..*

Nergiz 1991 Effect of Method of Extraction on the Total Polyphenol J Sci Food Agrie 56, 79–84.*

Giovacchino 1994 La Rwista Italiana Dell Sostanze Grasse vol LXX1 p 587–594.*

Ranalli 1988 La Rwista Italiana Delle Sostanze Grasse vol. 65 p 725–728.*

Giovacchino 1997 La Rwista Italiana Delle Sostanze Grasse vol LXX1V p 405–408.*

Giovacchino 1986 La Rwista Dell Sostanze Grasse vol. LXIII, Feb. p 119–123.*

Giovacchino 1986 Rwista delle Sostanze Grasse vol LXIII p.*

Brenes et al, J. Agricultural and Food Chemistry, vol. 43, No. 10, pp. 2702–2706 (1995).

* cited by examiner

*Primary Examiner*—Carolyn Paden
(74) *Attorney, Agent, or Firm*—Pillsbury Madison & Sutro LLP

(57) ABSTRACT

Process for debittering olive oil comprising the exposure of olive oil which contains bitter polyphenols for at least 30 seconds to a finely dispersed aqueous phase, preferably consisting of hard drinking water, of which the pH is at least 5.5.

12 Claims, No Drawings

DEBITTERING OF OLIVE OIL

The present invention is concerned with non-bitter olive oil with a high content of antioxidants and with processes for preparing such olive oil.

STATE OF THE ART

Olive oil is appreciated as a salad oil and as a frying oil for its delicious taste, not only in the traditional olive oil consuming countries, the Mediterranean area, but to an increasing extent also in Western Europe and the USA.

Traditionally, olive oil is prepared by harvesting the olive fruits and subjecting these to malaxation: crushing and kneading the olives with water so that a mash is obtained containing the whole content of the olive fruit including an aqueous phase. The mash contains also enzymes, including oil hydrolysing lipases, which originate from the olive fruits.

In order to avoid undesired olive oil hydrolysis the aqueous phase with all olive enzymes is separated from the oil phase e.g. by decanting, as soon as possible, anyway within one hour.

Many olive oils after separation of the aqueous phase still possess a strong bitter taste. Bitter olive oil often can be made fit for consumption by washing the crude oil with water which reduces the bitter taste to an acceptable level. This usual washing treatment employs a centrifuge for a quick final water separation. The contact time between water and oil therefore is very short, usually less than 30 seconds, practically only 10 seconds.

The bitter taste of olive oil is caused by so-called polyphenols, compounds which are native to olive oil. Those olive oil derived polyphenols comprise relatively apolar, oil soluble phenolic compounds as well as relatively polar, water soluble phenolic compounds. In the context of the present invention both groups are denoted as polyphenols. The bitter taste is caused mainly by the more apolar polyphenols. Apolar polyphenols comprise the compounds oleuropein, ligstroside and their aglycons. These are the main bitter polyphenols (Grasas y Aceites, 46, 1995, 299–303). The less bitter ones are polar polyphenols and comprise tyrosol, hydroxytyrosol, caffeic acid and vanillic acid. These water soluble polyphenols, which largely have the same beneficial properties (nutritional, oil stability) as the oil soluble ones, have a much lesser contribution to the bitter taste. The average polyphenols content of freshly pressed olive oil ranges from 100–300 ppm. The content depends on type of olives and on the time of harvesting. Up to now an olive oil which contains more than 300 ppm polyphenols is too bitter for consumption.

Polyphenols are potent antioxidants. Recently it was found that they play a role in enhancing the oxidation stability of olive oil (Nutr. Metab. Cardiovasc. Dis. (1995) 5:, 306–314). Moreover it has been discovered that a diet comprising food containing a substantial amount of olive oil polyphenols helps to prevent the harmful oxidation of low-density lipoproteins (LDL) in the blood. In a population with a high polyphenol intake the incidence of coronary heart disease is relatively low. Therefore the presence of polyphenols in an edible oil, including olive oil, and preferably at high levels, is much desirable. However, when the polyphenols content in olive oil raises over 300 ppm, the oil becomes unacceptably bitter, which correlates with a (K225) bitter index value over 0.3.

The water washings used for reducing bitterness unfortunately also remove a substantial part of the valuable polyphenols from the olive oil. Co-pending non-prepublished patent application EP 849 353 describes a process for an olive oil which contains 300–1000 ppm of polyphenols, while the bitter index K225 is not higher than 0.3 or, alternatively, containing 200–300 ppm of polyphenols, while the bitter index is not higher than 0.2. The native polyphenols are hydrolyzed employing a time consuming enzymatic process at a pH (5) which is optimal for enzyme activity.

The aim of the present invention is to provide an improved process for obtaining non-bitter olive oils with a high content of polyphenols.

STATEMENT OF INVENTION

We have found a new method for converting the olive oil derived oil soluble polyphenols into less bitter water soluble ones.

The present invention enables the reduction of bitterness not by usual removing bitter compounds from the olive oil, but predominantly by transforming them into compounds with reduced bitterness.

The process according to the present invention starts with olive oil which possesses a relatively high content of bitter polyphenols. The process comprises the following steps: preparing an emulsion of olive oil with an aqueous phase, exposing the olive oil to the dispersed aqueous phase for at least 30 seconds and removing the aqueous phase from the olive oil, characterized in that the emulsified aqueous phase is maintained at a pH of at least 5.5, preferably of at least 6, more preferably of at least 7, still more preferably of at least 8 for at least 30 seconds of the exposure time.

DETAILS OF THE INVENTION

Hydrolysis at a pH >5.5 has been found to be essential for the conversion of bitter fat soluble polyphenols into less bitter water soluble polyphenols within a proper period of time. At said pH such conversion has been found to occur after at least 30 seconds exposure of the olive oil to an aqueous phase. The pH may not remain constant during the process. During exposure it may sink temporarily below the required minimum value of 5.5. A minimum exposure time of 30 seconds, preferably 2 minutes, more preferably 5 minutes to a pH of at least 5.5 is required for debittering. The full effect is attained after still longer exposure times, preferably at least 30 minutes. Generally, after 120 minutes no further debittering effect is observed. Preferably, the aqueous phase consists of water, which contains reactive ions which are able to sustain the maintenance of the proper pH.

The presence of fatty acids originating from partial hydrolysis of the olive oil, has a pH lowering effect. The resulting pH is too low for suitable polyphenols hydrolysis.

It has been found that use of common hard drinking water provides the proper conditions for obtaining the found debittering effect. The presence of acid-binding reactive ions is believed first to constitute a pH >5.5, and then to maintain it for a time which is long enough to hydrolyse the bitter polyphenols into less bitter polyphenols.

Such acid-binding ions are found in hard drinking water which is produced from natural resources, particularly from surface water and from water pumped from deep ground layers. Such ions are e.g. one or more of the ions in the group constituted by carbonate, sulphate, magnesium and calcium. Maintenance of the required pH can be supported further by the presence of a proper buffer substance such as a (pH 8) citric acid/phosphate buffer.

Polyphenols originating from olive oil will migrate to the emulsion's aqueous phase. This aqueous phase may be separated by settling and decantation or by centrifugation, but preferably the aqueous phase is removed from the olive oil by evaporating the water under reduced pressure (vacuum drying). The polyphenols and possibly other ingredients in the aqueous phase phase are forced to get dispersed in the olive oil and then cause some turbidity.

More preferably, the oil/aqueous phase emulsion is filtered by a membrane using established membrane filtration technology such as known for the production of drinking water. The pores of the membrane allow passage of the water molecules, but not of the larger polyphenol molecules which stay in the olive oil. Use of membrane filtration also retains desirable olive oil volatiles, which otherwise would be evaporated when using the previously mentioned vacuum drying technique.

When an aqueous phase is selected which contains already a large amount of water soluble polyphenols, less migration of water soluble polyphenols from the olive oil into the aqueous phase will occur.

While normally olive oil is substantially depleted with polyphenols as an effect of the usual washing treatment, said embodiments of the invented process retain polyphenols, but remove bitterness by converting the bitter principle rather than by removing its substance.

The ratio of aqueous phase and olive oil in the emulsion preferably is 1:10 to 4:1, more preferably 1:4 to 2:1. Large amounts of water are not functional, and even not desired, because removal of water at the end needs energy and time. The best results are obtained when the emulsion has a continuous oil phase.

Obviously, it is vital that the mixture of aqueous phase and oil is vigorously stirred to ensure close contact of both phases. For obtaining a fine emulsion a powerful stirring device is required which is able to dissipate 0.1–5 kW, preferably 0.5–2 kW of energy for each 1000 kg of olive oil. Table I shows the effect of stirring on debittering.

TABLE I

| Energy dissipation in 1000 kg olive oil (kW) | Debittering attained after minutes |
|---|---|
| 0.025 | 60 |
| 0.25 | 45 |
| 1 | 5 |

For said energy dissipation a stirrer with a relatively large diameter and a relatively low stirring rate is suitable, e.g. a paddle type stirrer or a ribbon stirrer, preferably a stirrer with baffles.

For the debittering process an emulsion temperature of about 25° C. is most advantageous.

With the present invention an olive oil can be prepared with polyphenol contents as high as 300–1000 ppm, while nevertheless the bitter index K225 is not higher than 0.3 and as high as 200–300 ppm, while the bitter index is not higher than 0.2.

An olive oil which has been debittered according to the present invention can be recognized by its polyphenols composition as detected by high performance liquid chromatography (HPLC). The bitter polyphenols show up at a retention time of 40–52 minutes. Before treatment substantial peaks are found in that part of the HPLC spectrum. After the treatment those peaks are still visible but are much reduced. At the same time the peaks for water soluble polyphenols, which show up at 7–20 minutes retention time, have increased. The decrease and increase respectively of said peaks is characteristic for olive oil as an effect of the treatment according to the invention.

Consequently a further effect of the invented process is that the olive oil's ratio of apolar polyphenols and polar polyphenols shifts to more beneficial lower molar ratios, preferably being below 3 (see Table II). Obviously, absolute ratios depend on the initial ratio in untreated olive oil, which may vary widely.

The invention therefore provides an olive oil which is characterized in that it contains at least 200 ppm of polyphenols, while the weight ratio of apolar polyphenols and polar polyphenols is less than 3, preferably less than 2, more preferably less than 1.

A surprising additional benefit of the found process is that the treated olive oil may exhibit unexpected flavour improvements. Native Andalusian olive oil, for example, may show flavour defects. These defects have disappeared fully or to a large extent after the treatment of the invention using common hard drinking water.

The invention is illustrated by the following example:

EXAMPLE

Two volumes of extra virgin Andalusian olive oil and one volume of regular hard drinking water obtained from the local (city of Vlaardingen) tap water supply and having a pH of 8 were thoroughly mixed at a temperature of 25° C. using a mixing device which dissipated 1 kW of energy per ton of oil. After 30 minutes the headspace pressure was reduced to 10 mbar, the water was evaporated from the mixture and the oil became dry.

A tasting panel assessed the oil on bitterness before and after the treatment using a scale ranging from 0 (excellent) to 4 (unacceptable bitterness). The oil was rated 4 before the treatment and 0 thereafter. The content of polyphenols was measured by standard High Performance Liquid Chromatography (HPLC). See Table II.

TABLE II

| POLYPHENOLS CONTENT by HPLC | BEFORE TREATMENT | AFTER TREATMENT |
|---|---|---|
| polar polyphenols mmol/kg | 0.54 | 1.47 |
| apolar polyphenols mmol/kg | 1.67 | 0.5 |
| total polyphenols mmol/kg | 2.21 | 1.97 |
| ratio apolar/polar polyph. | 3.1 | 0.3 |
| total polyphenols (ppm) | 665 | 365 |

The drop in ppm values is relatively large, and is ascribed to the hydrolysed polyphenols being lighter molecules.

The values for K270 (0.18) and free fatty acids (0.45) showed that the treated oil still complied with requirements for extra virgin olive oil.

COMPARISON EXAMPLE

The preceding example was repeated, but using instead of hard drinking water demineralised water, having a pH of 6.5. At the onset of emulsion formation the pH of the aqueous phase immediately and definitely dropped below 5.5. Even after one hour of stirring, the tasting panel noticed no significant bitterness reduction.

What is claimed is:

1. A process for treating olive oil so as to debitter the oil which comprises the following steps:

a. preparing an emulsion of olive oil with an aqueous phase which is free from any substantial amount of debittering enzyme;

b. exposing the olive oil to the dispersed aqueous phase for at least 30 seconds; and c. removing the aqueous phase from the olive oil, where the emulsified aqueous phase is maintained at a pH of at least 5.5 for at least 30 seconds of the exposure time whereupon bitter components in said oil are rendered less bitter.

2. A process according to claim 1, where the aqueous phase phase is maintained at a pH of at least 7 for at least 30 seconds of the exposure time.

3. A process according to claim 1, where the aqueous phase consists of water which contains reactive ions which are able to neutralize substances which have a pH lowering activity.

4. A process according to claim 1, where said pH level is maintained for at least 2 minutes.

5. A process according to claim 1, where said pH level is maintained for at least 5 minutes.

6. A process according to claim 1, where the aqueous phase to be added contains olive oil derived polyphenols.

7. A process according to claim 1, where the ratio of aqueous phase and olive oil in the emulsion is 1:10 to 4:1.

8. A process according to claim 1, where the ratio of aqueous phase and olive oil in the emulsion is 1:4 to 2:1.

9. A process according to claim 1, where the aqueous phase is removed by evaporating the water under reduced pressure conditions.

10. A process according to claim 1, where the aqueous phase is removed by membrane filtration.

11. A process according to claim 1, where the aqueous phase consists essentially of hard drinking water containing acid-binding reactive ions sufficient to maintain the pH of at least 5.5.

12. A process for treating olive oil in order to reduce the bitterness thereof which comprises:

a. mixing the olive oil to be treated with water which is essentially free from debittering enzyme, so as to form an aqueous emulsion of the olive oil;

b. maintaining said emulsion at a pH of at least 5.5 for at least 30 seconds sufficient to convert bitter polyphenols in the oil to less bitter polyphenols and thereafter;

removing the water from the oil.

* * * * *